United States Patent
Charland et al.

(10) Patent No.: US 11,623,658 B1
(45) Date of Patent: Apr. 11, 2023

(54) SYSTEM AND METHOD FOR GENERATING INFORMATION ON REMAINDER OF MEASUREMENT USING SENSOR DATA

(71) Applicant: Aurora Operations, Inc., Mountain View, CA (US)

(72) Inventors: Jake Charland, Winter Park, CO (US); Ethan Eade, Pittsburgh, PA (US); Karthik Lakshmanan, Pittsburgh, PA (US); Daniel Munoz, Pittsburgh, PA (US); Samuel Sean, Oxford (GB); Yuchen Xie, Cupertino, PA (US); Luona Yang, Pittsburgh, PA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 17/840,218

(22) Filed: Jun. 14, 2022

Related U.S. Application Data

(60) Provisional application No. 63/343,701, filed on May 19, 2022.

(51) Int. Cl.
*B60W 60/00* (2020.01)
*G06T 15/08* (2011.01)

(52) U.S. Cl.
CPC ........... *B60W 60/001* (2020.02); *G06T 15/08* (2013.01); *B60W 2420/42* (2013.01); *B60W 2420/52* (2013.01); *B60W 2510/0638* (2013.01)

(58) Field of Classification Search
USPC ........................................................ 701/23
See application file for complete search history.

(56) References Cited

U.S. PATENT DOCUMENTS

| | | | |
|---|---|---|---|
| 9,807,564 B2 | 10/2017 | Aksamit | |
| 10,732,261 B1 | 8/2020 | Wang | |
| 10,976,410 B1 | 4/2021 | Wang | |
| 11,409,304 B1* | 8/2022 | Cai | G05D 1/0251 |
| 2018/0364717 A1* | 12/2018 | Douillard | G05D 1/024 |
| 2020/0041994 A1* | 2/2020 | Alalao | H04W 4/18 |
| 2021/0253131 A1 | 8/2021 | Sen et al. | |
| 2022/0204019 A1* | 6/2022 | Lauterbach | G06V 10/44 |

* cited by examiner

*Primary Examiner* — Tyler D Paige
(74) *Attorney, Agent, or Firm* — Foley & Lardner LLP

(57) ABSTRACT

A method may include obtaining sensor data that include a plurality of sensor returns from an environment of an autonomous vehicle. A first set of features may be extracted from the sensor data. The first set of features may be processed with a machine learning model to generate, for at least a subset of the plurality of sensor returns, a first output that classifies a respective sensor return as corresponding to an object or non-object and a second output that indicates a property of the object. The sensor returns classified as corresponding to objects may be compared to a plurality of pre-classified objects to generate one or more generic object classifications. The autonomous vehicle may be controlled based at least in part on the one or more generic object classifications.

22 Claims, 8 Drawing Sheets

SYSTEM AND METHOD FOR GENERATING INFORMATION ON REMAINDER OF MEASUREMENT USING SENSOR DATA

CROSS-REFERENCE TO RELATED APPLICATION

This application claims priority to U.S. Provisional Patent Application No. 63/343,701, filed May 19, 2022, which is incorporated by reference in its entirety for all purposes.

BACKGROUND

A fundamental challenge in autonomous vehicle technology is collecting and interpreting information about a vehicle's surrounding environment and executing commands to appropriately control vehicle motion to safely navigate the vehicle through the environment. For example, one or more sensors of an autonomous vehicle (or a vehicle equipped with autonomous vehicle sensors) can capture measurement data and use the measurement data to track and/or identify dynamic objects within the environment surrounding the vehicle. As the state of the objects dynamically changes, improvement in efficiently updating the tracking and/or identifying of the object by using new measurement data remains desired.

SUMMARY

Implementations of the present disclosure relate to a system and a method for generating information from sensor data using a machine learning (ML) model and particularly to a system and a method for generating object presence information and object motion information on objects that do not belong to a predetermined class of objects (e.g., "vehicle," "pedestrian," "cyclist," "road sign," etc.). Such objects may be referred to as "remainders" or "generics" in this disclosure.

Disclosed herein are embodiments related to a system and method for improving latency and avoiding redundancy in collecting and interpreting information about a vehicle's surrounding environment and executing commands to appropriately control vehicle motion. In some implementations, even if other components of a perception system (e.g., detector or tracker) fail to explain or predict an object (false negative) from sensor data, a remainder explainer system can cover for false negatives by explaining or predicting the "unexplained" sensor data and performing graceful degradation, thereby fulfilling a policy of "no measurement left behind." In some implementations, instead of predicting unexplained sensor data with labels, the remainder explainer system may predict the opposite, i.e., known objects in the world to which the vehicle should pay attention, and take the complement of the known object labels as labels of unexplained sensor data.

In this manner, unexplained sensor data (e.g., ground, animals, debris, balls, barrier, etc.) can be efficiently explained without using relatively expensive labelling techniques. Moreover, the remainder explainer system can utilize an input of track data obtained from other components of the perception system (e.g., tracker) to de-duplicate objects from the unexplained sensor data, thereby not only avoiding redundancy but also more accurately explaining the unexplained sensor data.

In some implementations according to a first aspect of the present disclosure, a method includes obtaining sensor data that include a plurality of sensor returns from an environment of an autonomous vehicle. The method may include extracting a first set of features from the sensor data. The method may include processing the first set of features with a machine learning model to generate, for at least a subset of the plurality of sensor returns, a first output that classifies a respective sensor return as corresponding to an object or non-object and a second output that indicates a property of the object. The method may include comparing the sensor returns classified as corresponding to objects to a plurality of pre-classified objects to generate one or more generic object classifications. The method may include controlling the autonomous vehicle based at least in part on the one or more generic object classifications.

In some implementations according to a second aspect of the present disclosure, a system includes one or more processors and one or more memories operably coupled with the one or more processors. The one or more memories may store instructions that, in response to the execution of the instructions by one or more processors, cause the one or more processors to obtain sensor data comprising a plurality of sensor returns from an environment of an autonomous vehicle. The one or more processors may extract a first set of features from the sensor data. The one or more processors may process the first set of features with a machine learning model to generate, for at least a subset of the plurality of sensor returns, a first output that classifies a respective sensor return as corresponding to an object or non-object and a second output that indicates a property of the object. The one or more processors may compare the sensor returns classified as corresponding to objects to a plurality of pre-classified objects to generate one or more generic object classifications. The one or more processors may control the autonomous vehicle based at least in part on the one or more generic object classifications.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
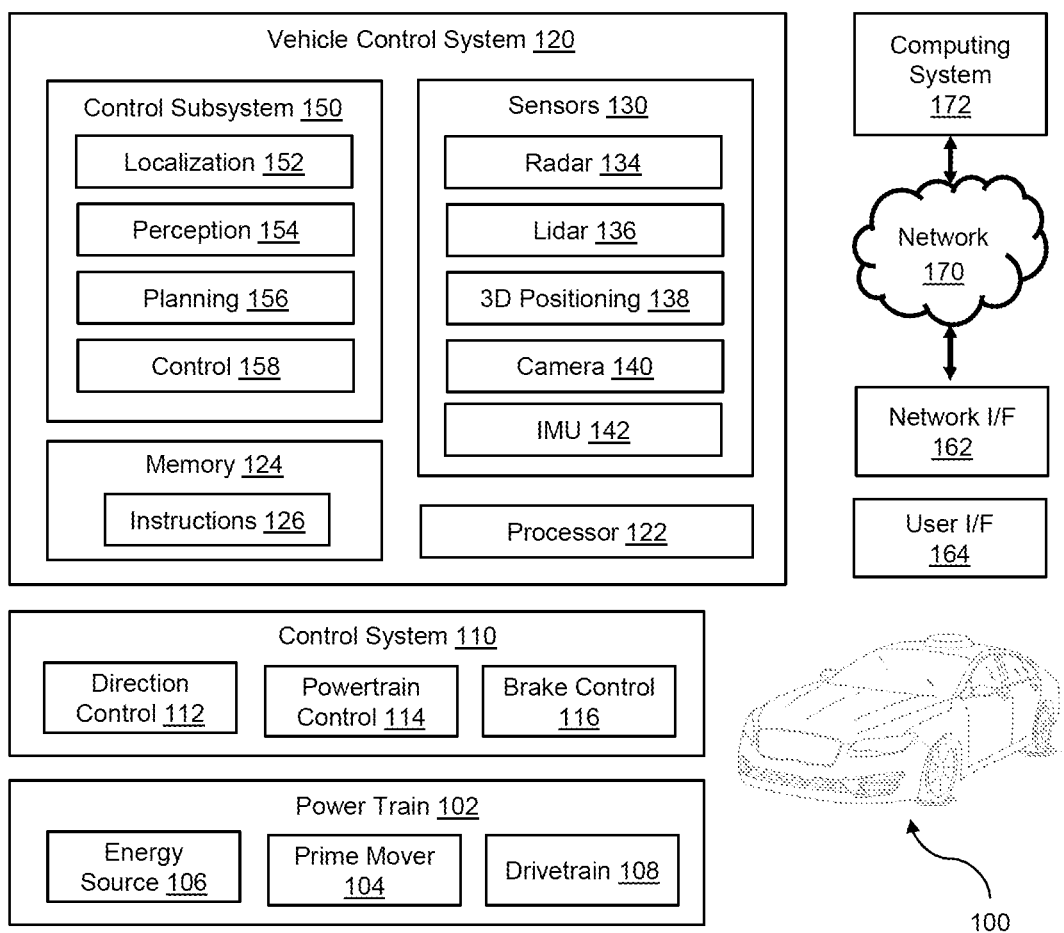
FIG. 1 is a block diagram illustrating an example of a system environment for autonomous vehicles according to some implementations.

According to certain aspects, embodiments in the present disclosure relate to techniques for training a machine learning (ML) model and generating data using the trained ML model, and more particularly to system and method for training an ML model and generating object presence information and object motion information on measurement data corresponding to unexplained or generic objects.

In order to appropriately control (or "plan") the motion of an autonomous vehicle to navigate the vehicle through its current environment, a system (e.g., a perception system) may capture measurement data from one or more sensors of an autonomous vehicle (or a vehicle equipped with autonomous vehicle sensors) and use the data for "perception", e.g., tracking and/or identifying dynamic objects within the environment surrounding the vehicle. As the state of the objects dynamically changes, there is a need for updating the tracking and/or identifying of the object, e.g., by using new measurement data. Conventional perception systems update a track associated with an object by scanning data measured from the whole scene surrounding the vehicle, incurring significant delays in updating the track. For example, conventional perception systems may need to collect new measurement data from the whole scene surrounding the vehicle, and match or associate the new measurement data with respective tracks of objects to identify where all those objects are in the new scene.

A perception system may track (1) objects (or actors) like vehicles, pedestrians and cyclists, (2) "obscurants"—something motion-planning should ignore (e.g., rain, snow, fog, smoke, exhaust, etc.), and/or (3) "generics"—matter that has not been explained as objects or obscurants (e.g., animals, debris, balls, barrier, etc.). Generating such tracks of obscurants or generics, however, may be a complicated process that requires interactions among multiple perception modules, for example, a tracker, a detector, and so on. There are several challenges in implementing the perception system.

First, it may be challenging to explicitly label obscurants, train an obscurant classifier, and explain away sensor data that are believed to be obscurants, as enumerating and labeling all types of obscurants may be difficult. For example, there may be a ghost return from retro-reflective reflectors (e.g., traffic signs) on the ground. The ghost returns may be a "blooming" of lidar points around retroreflectors, leading to spurious lidar returns around the true object in an empty space. The returns are hard to label because they show up sporadically around the true object. The returns also may be higher in elevation than the true position of the reflectors and thus false positive generics are spawned from them. Such obscurant failure modes are difficult to discover without being alerted by a false positive first. It is also very difficult to explicitly label them even if one is aware of such failure mode.

Second, removing ground points by using ground elevation from an atlas or a map can be very challenging as a perception system attempts or tries to detect smaller things at longer ranges. Ground elevation queried from an atlas when running onboard can suffer accuracy problems due to a variety of reasons (e.g., ground surface resolution, error in localization), which can be exaggerated at longer ranges due to the lever-arm effect. The lever-arm effect occurs when small angular errors in pose (especially pitch) lead to large spatial errors at longer distances, e.g., a distance to the point of interest. This effect is analogous to looking from a vertex to the other side of a triangle—the further away the side gets, the larger it gets, even though none of the angles have been changed.

Third, sometimes it is difficult to distinguish ground from real objects. In such cases, it is hard to label the ground as obscurants.

To solve these problems, implementations of the present disclosure relate to techniques for simplifying the process of classifying sensor returns as objects or not objects. In some implementations, a perception system of an autonomous vehicle may include a remainder explainer system that uses a model (e.g., ML model) that partitions sensor data into "objects" (e.g., vehicles, pedestrians, cyclists, and other objects the motion planning system of the vehicle should care about) and "obscurants" (e.g., rain, snow, fog, smoke, exhaust, errant sensor returns, and other things the motion planning system should ignore). The remainder explainer system may explain the sensor measurements that are not yet explained by other components of the perception system (e.g., detectors or trackers). In some implementations, instead of predicting obscurants with labels and using the prediction results to explain away sensor data, the remainder explainer system may predict the opposite, i.e., objects in the world to which the vehicle should pay attention. For example, the remainder explainer system may predict all tangible objects in the scene and attributes for the objects. The rest of the returns then, by default, may be considered obscurants that the motion planning system can ignore. In this manner, because generic objects are labeled (e.g., as known or predetermined object categories), the remainder explainer system can take the complement of generic object labels as obscurant labels (with the subtlety of also including ground). For example, in a case where it is difficult to distinguish an obscurant (e.g., ground) from real objects, the remainder explainer system can handle this case without explaining or explicitly labeling the ground.

In some implementations, the remainder explainer system may perform (1) classification of sensor data and (2) generation of generic tracks (e.g., generating and publishing (or reporting) generics from unexplained sensor returns). In some implementations, the classification of sensor data may be triggered by new measurement data coming in, while the generation of generic tracks may be triggered by a new track bundle coming in.

In some implementations, the remainder explainer system does not track the scene (or object) over time, but may track "generics" as generic tracks. Here, "generics" refer to sensor returns that have been classified as objects and that motion-planning should not ignore but that have not been explained as a particular type or class of object. Generics may be implemented as a type of track that is neither tracked over time (therefore no consistency of generic tracks over time is guaranteed), nor describes the boundaries of object instances. Generics may include information on a predicted location of matter and its instantaneous velocity. In some implementations, generics may be published or reported at the same frequency as object tracks, e.g., less than or equal to 20 Hz. In some implementations, the remainder explainer system may predict for each unit in a voxelized view, information such as obscurant-or-not, velocity and attribute (of a generic track), etc., to publish actor information required by a motion planning system.

In some implementations, the remainder explainer system can fulfil the policy of "no measurement left behind" by (1) handling classes not handled by the main tracker, including animals, debris, balls, barriers, etc., (2) providing graceful degradation for the perception system by covering for false negatives, and/or (3) recognizing static parts of the world (e.g., barriers). In some implementations, the remainder explainer system can explain or predict foreign objects and debris (FODs)—e.g., objects found in inappropriate locations. Based on experimentation, most FODs were characterized as (1) static, (2) "straddle-able" (e.g., an object having a small size so that a vehicle can straddle over the object), and/or (3) likely requiring camera to be detected or predicted.

In some implementations, even if other components of a perception system (e.g., detector or tracker) fail to explain or predict an object (false negative), the remainder explainer system can cover for false negative by explaining or predicting the object and performing graceful degradation (for example, taking backup safety precaution—giving warning like "we don't know what it is but don't hit this"). Even if an object is not clearly detected or identified, the remainder explainer system can provide a low fidelity velocity profile of the object (e.g., as an generic track), thereby fulfilling the perception system's policy of "no measurement left behind." In some implementations, the remainder explainer system can process data per voxel so that it does not identify a shape or a detailed appearance of an object.

In some implementations, the remainder explainer system may perform a low fidelity classification into non-ignorable objects and ignorable non-object ("obscurant"; e.g., rain, snow, fog, smoke, exhaust, etc.). In some implementations, the remainder explainer system may perform classification into different categories: for example, vulnerable or non-vulnerable, harmful or non-harmful, etc.

In some implementations, the remainder explainer system may output a range view as an output of the classification process, while other components of the perception system (e.g., detector or tracker) may output a bird's-eye view. The remainder explainer system may output a rasterized view and/or a grid view. In some implementations, after generating an output view (e.g., a rasterized view or 3-D voxel map), the remainder explainer system may take or input a location, e.g., an (x, y, z) coordinate, and check with a result of the classification process on that location. If the location is already explained (e.g., object exists) by the classification process, the remainder explainer system may throw away (discard or remove or delete or ignore) the output view of that location.

In some implementations, the remainder explainer system can handle off-road generic or static objects as well as on-road generic or static objects. In some implementations, the remainder explainer system may use a labelling scheme that only considers or detects generic objects on-road, e.g., a scheme that only labels out generic objects within a certain distance from the road region boundary, and the remainder explainer system may perform inference only on such regions as well. Using the labelling scheme, for static objects, the remainder explainer system may only consider or detect those on-road because a planning system can treat the road region boundary as something the autonomous vehicle (AV) should never go beyond, so reporting static objects beyond the road region boundary will not change AV behaviors. Limiting labeling and inference to only on-road can improve data efficiency and reduce unnecessary labelling cost. For objects off road, the remainder explainer system may still need to predict their velocity, in case something might move towards the AV's path.

In some implementations, the remainder explainer system (e.g., the classification process) may use a labelling scheme similar to that of on-road generic objects to report and/or visualize off-road static objects upon requests. The remainder explainer system, however, can provide information on off-road static objects with a precision lower than that of on-road objects (e.g. it may report false positive static objects) because AV behaviors will not be affected. In summary, the off-road prediction can either follow a labelling scheme similar to that of on-road prediction, or use a simplified scheme for predicting velocity, and the remainder explainer system can afford to choose a high recall/low precision operating point (see FIG. 7B) for off-road use.

In some implementations, the remainder explainer system may perform a process of generating of generic tracks (or "generic generator") by predicting a velocity vector of generics. The prediction may be performed by (1) taking or inputting feature vectors at a current time and a previous time, (2) applying techniques of vision or machine learning (e.g., neural network), and (3) outputting a prediction result. In some implementations, the remainder explainer system may output a velocity vector for each sensor return (e.g., LIDAR point). In some implementations, the remainder explainer system may further take inputs of classification and a velocity vector, and generate 3-D voxel map (e.g., voxel of 25 cm).

In some implementations, the generic generation process can output generic tracks in the form of boxes, while in other implementations generic tracks do not describe the boundaries of object instances. There are advantages to both approaches. For example, lower latency can be achieved when the boundaries are not described in generic tracks. On the other hand, when the boundaries are available in generic tracks, the boundaries can be compared with those of objects detected by a main detector and de-duplicated from the objects detected by the main detector, thereby more accurately detecting generics. Generic tracks may have instantaneous dynamics, but no cycle to cycle consistency. In some implementations, the remainder explainer system can only report objects that can cause or receive "harm" in which "harm" is platform agnostic. The perception system can use reported object size to decide on "straddle ability." In some implementations, the perception system or the remainder explainer system can output information in form of a static raster. The remainder explainer system, in some implementations, can generate output in such a high precision to satisfy the requirement of the perception system which has low tolerance for false positives at highway speeds. For example, the remainder explainer system can not only filter out "obscurants", but also provide reasonable dynamics estimates. The remainder explainer system also can generate output with a high recall. For example, the remainder explainer system can report all objects that may cause "harm" and the perception system can use reported object size to decide "straddle ability." The remainder explainer system can also generate output at long range. For example, outputs can have a range of 160 m behind for merges, a range of 200 m ahead for stopping for any obstacle, or a range of 300 m ahead for sufficient time to lane change.

In some implementations, the remainder explainer system may classify points into object(s) or obscurant(s) in a range-view. After performing a clustering (e.g., some naive clustering), the classification process may send (or ship) the clustering or classification output to the generic generation process. The generic generation process may receive the output from the classification process and fuse or combine the received output with a latest track output, creating "generic" tracks from explanations that are not explained by tracks. The generic generation process may apply a range view-based model to lidar points to perform or optimize a few tasks, for example, multi-class detection, multi-class trajectory prediction, lidar point segmentation, and class agnostic detection. In some implementations, the generic generation process may (1) take as input sensor-complete data (e.g., camera/radar/lidar) and a map, (2) output generic tracks with instantaneous velocity, and (3) handle multiple objects in z direction (e.g., object under overpass).

In some implementations, the remainder explainer system may use a substantial number of generic object labels and/or obscurant labels. In some implementations, instead of classifying whether a return belongs to a real object, the remainder explainer system may classify whether it is obscurant. In some implementations, the remainder explainer system may perform a removal of ground via a post processing, using the ground surface from an atlas or a map. In some implementations, instead of treating point counts and ray-tracing statistics as features, the remainder explainer system may perform filtering based on point counts and ray-tracing statistics as a post-processing step. One advantage of this post-processing step is to reduce false positives. The post-processing can be outside of a ML model (e.g., a pytorch model), or inside the ML model as a weight-free component (e.g., a component not learned).

In some implementations, the remainder explainer system may predict real objects or generic tracks directly by performing a ground subtraction as part of the learning/inference process, which takes advantage of local sensor measurements, with optional map information as a priori. In some implementations, post-processing can be performed to improve generic quality, e.g. using ray-tracing stats for rejecting false positive from reflection. In some implementations, the remainder explainer system may perform such post-processing as part of the learning/inference process. Post-processing can be subsumed or integrated into the learning/inference process by providing similar features. In some implementations, the remainder explainer system may directly transform and pack the output of the model into generic tracks, thereby easily adjusting the learning objective to reflect what is needed for the planning system. In some embodiments, assuming an output view includes a plurality of cells, the remainder explainer system can output a generic track by performing prediction based on a model per cell, post-processing that buckets, clusters, and/or classifies the predicted cells, and generation of generic tracks by providing explanation. While explanation by tracks, roadways and other outside sources can be part of the post-processing after a model learning/inference process, in some implementations, the remainder explainer system can potentially provide such explanation as an model input, so that the prediction can move even closer to what the system publishes or reports (to the planning system, for example). In some implementations, the remainder explainer system can generate or produce a set of generic tracks that account for unexplained sensor data that are believed to be from real objects. In some implementations, the output of a model (e.g., neural network) may be is a point-wise prediction of objectness (e.g., object or non-object), velocity, and/or attributes.

Implementations in the present disclosure have at least the following advantages and benefits.

First, implementations in the present disclosure can provide useful techniques for efficiently explaining ground/obscurant without predicting obscurant and using the prediction result to explain away sensor data. The remainder explainer system instead labels out and predict all tangible objects in the scene, so that the rest of the returns then by-default may fall into the "don't care" category, within which the system may optionally label out ground/obscurant explicitly as desired. This method has the following advantages. In this manner, the labeling process can be simplified because it can be very difficult to identify all obscurants, while identifying all real objects is relatively easier and more intuitive.

Second, implementations in the present disclosure can provide useful techniques for handling ground with a learned model in a more robust manner than using an atlas or a map. Ground elevation from the atlas or map can be inaccurate due to a variety of error sources, e.g. map resolution limit, map inaccuracy, localization inaccuracy, to name a few. Therefore, depending on ground elevation to exclude false positives from ground point is not a robust solution, and the inaccuracies may become worse as range increases. To solve this problem, the remainder explainer system according to some implementations can perform a ground subtraction as part of the learning/inference process, which takes advantage of local sensor measurements, with optional map information as a priori.

Third, post-processing can be simplified by performing post-processing as part of the learning/inference process. Post-processing can be performed to improve generic quality, e.g. using ray-tracing stats for rejecting false positive from reflection. Post-processing can be subsumed or integrated into the learning/inference process by providing similar features.

Fourth, output of a learned model (e.g., ML model) can be easily predicted and adjusted to be used by a planning system. For example, the output of the model can be almost directly transformed and packed into generic tracks, thereby easily adjusting the learning objective to reflect what is needed for the planning system.

I. System Environment for Autonomous Vehicles

FIG. 1 is a block diagram illustrating an example of a system environment for autonomous vehicles according to some implementations.

Referring to FIG. 1, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 include wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100.

The outputs of sensors 130 may be provided to a set of control subsystems 150, including, a localization subsystem 152, a planning subsystem 156, a perception subsystem 154, and a control subsystem 158. The localization subsystem 152 is principally responsible for precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control an autonomous vehicle to implement the planned trajectory.

It will be appreciated that the collection of components illustrated in FIG. 1 for the vehicle control system 120 is a mere example. Individual sensors may be omitted in some implementations. Additionally or alternatively, in some implementations, multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc.

In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a passenger or an operator, e.g., one or more displays, touchscreens, voice and/or gesture interfaces, buttons and other tactile controls, etc. Otherwise, input from a passenger or an operator may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. In many implementations, data collected by the one or more sensors 130 can be uploaded to a computing system 172 via the network 170 for additional processing. In some implementations, a time stamp can be added to each instance of vehicle data prior to uploading. Additional processing of autonomous vehicle data by computing system 172 in accordance with many implementations is described with respect to FIG. 2, FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1 is not intended to limit implementations disclosed herein. Indeed, other alternative hardware and/or software environments may be used without departing from the scope of implementations disclosed herein.

II. Computing Systems for Processing Autonomous Vehicle Data

Figure 2:
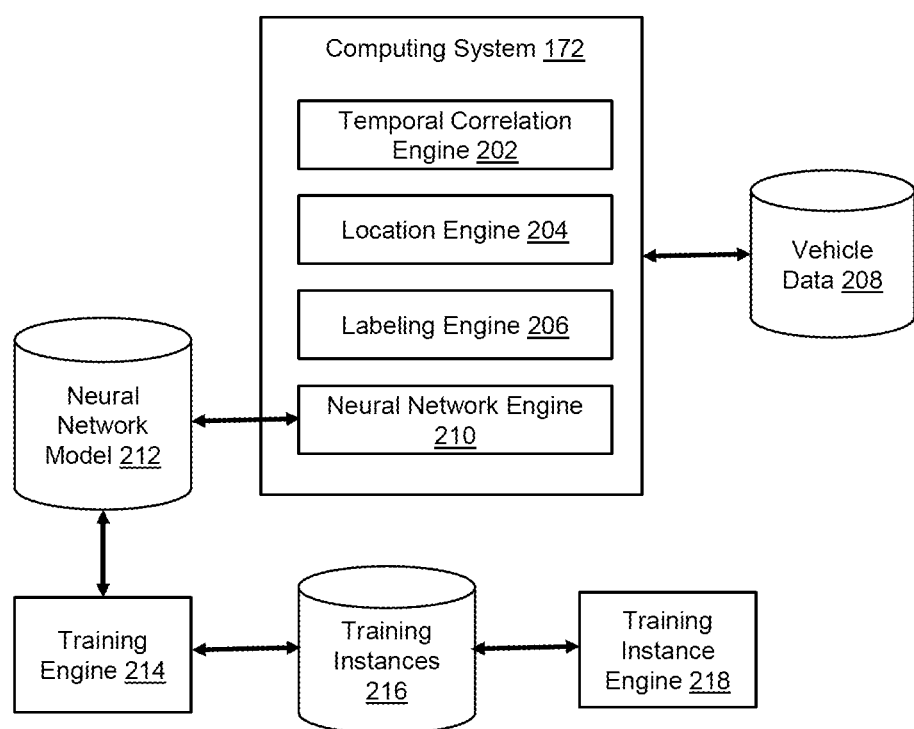
FIG. 2 is a block diagram illustrating an example of a computing system for training a neural network model according to some implementations.

FIG. 2 is a block diagram illustrating an example of a computing system for training a machine learning model such as a neural network model according to some implementations.

The computing system 172 can receive time stamped vehicle observations (i.e., a collection of vehicle data and/or environmental data collected by one or more autonomous vehicle(s) as well as one or more non-autonomous vehicle(s)) via the network 170 (see FIG. 1). In some implementations, the computing system 172 may include a temporal correlation engine 202, a location engine 204, a labeling engine 206, a neural network engine 210, a training engine 214, and a training instance engine 218. The temporal correlation engine 202, location engine 204, labeling engine 206, neural network engine 210, training engine 214, and training instance engine 218 are example components in which techniques described herein may be implemented and/or with which systems, components, and techniques described herein may interface. The operations performed by one or more engines 202, 204, 206, 210, 214, 218 of FIG. 2 may be distributed across multiple computing systems. In some implementations, one or more aspects of engines 202, 204, 206, 210, 214, 218 may be combined into a single system and/or one or more aspects may be implemented by the computing system 172. For example, in some of those implementations, aspects of the temporal correlation engine 202 may be combined with aspects of the labeling engine 206. Engines in accordance with many implementations may each be implemented in one or more computing devices that communication, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques.

The computing system 172 can perform a variety of processing of on vehicle data 208. In some implementations, the vehicle data 208 includes time stamped autonomous vehicle data (as described herein with respect to FIG. 1). The temporal correlation engine 202 can (if necessary) synchronize time stamps between sets of data collected by separate vehicles collecting data in the same environment. For example, while two vehicles were collecting data in an environment simultaneously, the time stamps appended to the data from one vehicle may not correspond to the time stamps to the data collected from another vehicle. In some implementations, time stamps in data collected by one vehicle can be shifted to correspond to time stamps in data collected by another vehicle.

The location engine 204 can determine the proximity of vehicles within the environment (often at each time stamp) from the vehicle data 208. In some implementations, the co-presence of vehicles can be determined using one or more proximity sensors within a vehicle. In some implementations, signals from proximity sensors can indicate a wide variety of ranges including: not in range, within one meter, within five meters, within ten meters, within fifty meters, within one hundred meters, within two hundred meters, etc. In some implementations, only vehicle data where vehicles are within a threshold level of proximity may be further processed (e.g., only data from vehicles within a 250 meter range may be additionally processed).

Additionally or alternatively, vehicles can move in and out of a threshold range of proximity as they maneuver in the environment. For example, only data at time stamps where vehicles are in proximity range can be additionally processed. In some implementations, portions of vehicle data where vehicles are not in proximity can be discarded.

The location engine 204 can additionally or alternatively determine vehicle locations using vehicle data 208 along with high-definition maps built with sensory data, for example. In some implementations, 3D positioning sensor data, such as a position provided by a GPS system can localize vehicles within an environment. In other implementations, common landmarks can be used to localize the position of vehicles in an environment. Common landmarks can include a variety of objects including stationary objects such as buildings, street signs, stop signs, traffic lights, mailboxes, trees, bushes, sections of a fence, etc. The distance of an autonomous vehicle to the common landmark (e.g., using lidar data) can be determined from autonomous vehicle data. Similarly, the distance of an additional vehicle to the common landmark can be determined from the additional vehicle. A distance between the autonomous vehicle and the additional vehicle can be calculated at a specific time stamp using the distance of each vehicle to the common landmark. For example, a common landmark such as a stop sign can be captured in autonomous vehicle data as well as in non-autonomous vehicle data (which may be collected using, for example, autonomous vehicle sensor(s) mounted on a non-autonomous vehicle). Data collected by corresponding vehicle lidar units can determine a distance from each vehicle to the stop sign at the same time stamp. The distance between the autonomous vehicle and the non-autonomous vehicle can be calculated using the distance of each vehicle to the stop sign. Additionally or alternatively, the additional vehicle can determine its location in a map using a 3D reference frame (such as an earth-centered, earth-fixed reference frame). In some implementations, an autonomous vehicle can determine its location on the same map, with respect to the same reference frame, and/or one or more additional methods of determining its location with respect to the same map as the additional vehicle.

The labeling engine 206 can generate labels (in some implementations automatically generate labels) for autonomous vehicle data using vehicle data collected from one or more additional vehicles. In some implementations, the computing system 172 can determine whether two vehicles are co-present in an environment using the location engine 204. In some implementations, the labeling engine 206 can determine instances of autonomous vehicle data which only captures a single additional vehicle co-present in the environment (i.e., when the autonomous vehicle is known to be within a proximity range of an additional vehicle, and only one vehicle is captured in the autonomous vehicle data, generally the additional vehicle will be the vehicle captured in the autonomous vehicle data). In some implementations, the labeling engine 206 can determine instances of autonomous vehicle data which captures additional non-vehicle objects co-present with the current vehicle in the environment. Data collected from the additional vehicle can be mapped to the location of the additional vehicle in the instance of autonomous vehicle data at a common time stamp. For example, a brake light signal of a non-autonomous vehicle (equipped with autonomous vehicle sensors) can be collected via a controller area network (CAN) bus and time stamped by a computing device of the non-autonomous vehicle. A label indicating the status of the brake lights of the non-autonomous vehicle can be mapped to the position where the non-autonomous vehicle is captured in autonomous vehicle data to automatically generate a brake light label for the non-autonomous vehicle at the corresponding time stamp. Additionally or alternatively, additional vehicle data identifying the non-autonomous vehicle, such as vehicle dimensions, can be used to determine a precise bounding box around the non-autonomous vehicle in the autonomous vehicle observations. In other implementations, the labeling engine 206 can utilize locations of two vehicles determined by location engine 204 (e.g., locations determined using GPS data collected from each vehicle and/or by localizing each vehicle using a common landmark(s) in the environment).

The neural network engine 210 can train a neural network model 212. The neural network model 212, in accordance with some implementations, can include a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally or alternatively, the neural network model 212 can represent a variety of machine learning techniques in addition to neural networks such as support vector machines, decision trees, Bayesian networks, other machine learning techniques, and/or combinations of machine learning techniques. Training the neural network model 212 in accordance with some implementations described herein can utilize the neural network engine 210, training engine 214, and training instance engine 218. Neural network models can be trained for a variety of autonomous vehicle tasks including determining a target autonomous vehicle location, generating one or more signals to control an autonomous vehicle, tracking or identifying objects within the environment of an autonomous vehicle, etc. For example, a neural network model can be trained to identify traffic lights in the environment with an autonomous vehicle. As a further example, a neural network model can be trained to predict the make and model of other vehicles in the environment with an autonomous vehicle. In many implementations, neural network models can be trained to perform a single task. In other implementations, neural network models can be trained to perform multiple tasks.

The training instance engine 218 can generate training instances to train the neural network model. A training instance can include, for example, an instance of autonomous vehicle data where the autonomous vehicle can detect an additional vehicle using one or more sensors and a label corresponding to data collected from the additional vehicle. The training engine 214 may apply a training instance as input to neural network model 212. In some implementations, the neural network model 212 can be trained using at least one of supervised learning, unsupervised learning, or semi-supervised learning. Additionally or alternatively, neural network models in accordance with some implementations can be deep learning networks including recurrent neural networks, convolutional neural networks (CNN), networks that are a combination of multiple networks, etc. For example, the training engine 214 can generate a predicted neural network model output by applying training input to the neural network model 212. Additionally or alternatively, the training engine 214 can compare the predicted neural network model output with a neural network model known output from the training instance and, using the comparison, update one or more weights in the neural network model 212. In some implementations, one or more weights may be updated by backpropagating the difference over the entire neural network model 212.

Figure 3:
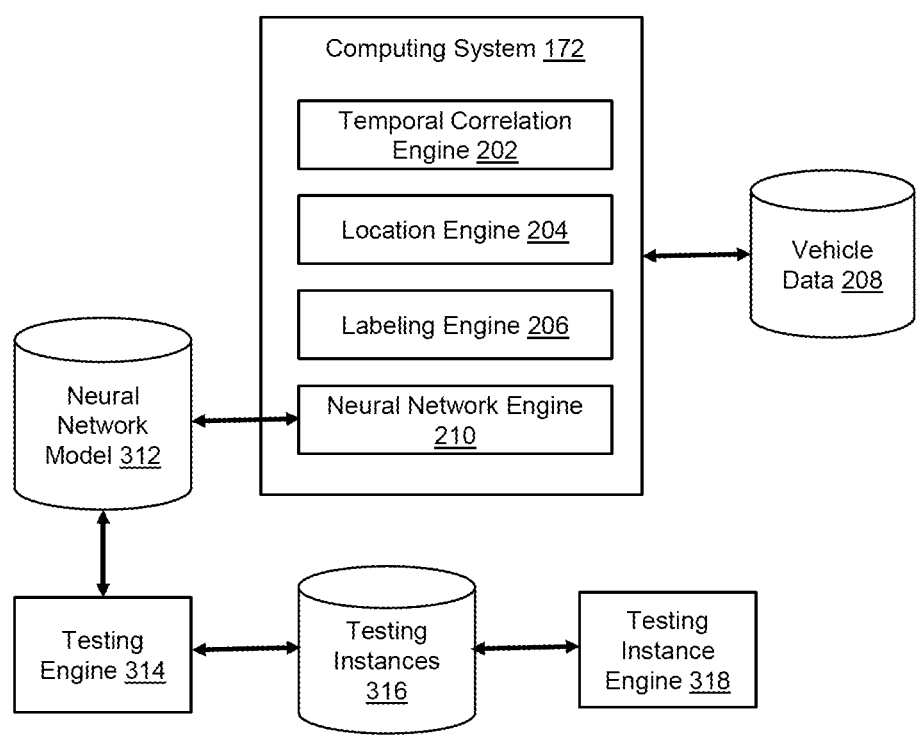
FIG. 3 is a block diagram illustrating an example of a computing system for testing a neural network model according to some implementations.

FIG. 3 is a block diagram illustrating an example of a computing system for testing a trained neural network model according to some implementations. The computing system 172, temporal correlation engine 202, location engine 204, labeling engine 206, and vehicle data 208 are described in the foregoing sections with respect to FIG. 2. The neural network engine 212, testing engine 314, and testing instance engine 318 in accordance with some implementations can be utilized to generate testing instances for autonomous vehicle data including a label corresponding to an additional vehicle or a non-vehicle object present in the autonomous vehicle data, as well as to test a trained (or learned) neural network model 312. In some implementations, the trained neural network model 312 can generate a predicted output for a single autonomous vehicle task. In other implementations, the trained neural network model 312 can generate a predicted output for multiple autonomous vehicle tasks. Testing instance engine 314 can generate testing instances 316 using labeled autonomous vehicle data collected from an autonomous vehicle and an additional vehicle (or a non-vehicle object), performing the specific autonomous vehicle task the neural network model 312 is trained for.

A testing instance, for example, can include an instance of autonomous vehicle data where an additional vehicle (or a non-vehicle object) is detected by one or more sensors of the autonomous vehicle, and a label corresponding to data collected by the additional vehicle. The testing engine 314 can apply a testing instance as input to the neural network model 312. A predicted output generated by applying a testing instance to the neural network model 312 can be compared with a known output for the testing instance (i.e., a label generated by the labeling engine 206) to update an accuracy value (e.g., an accuracy percentage) for the neural network model.

Figure 4:
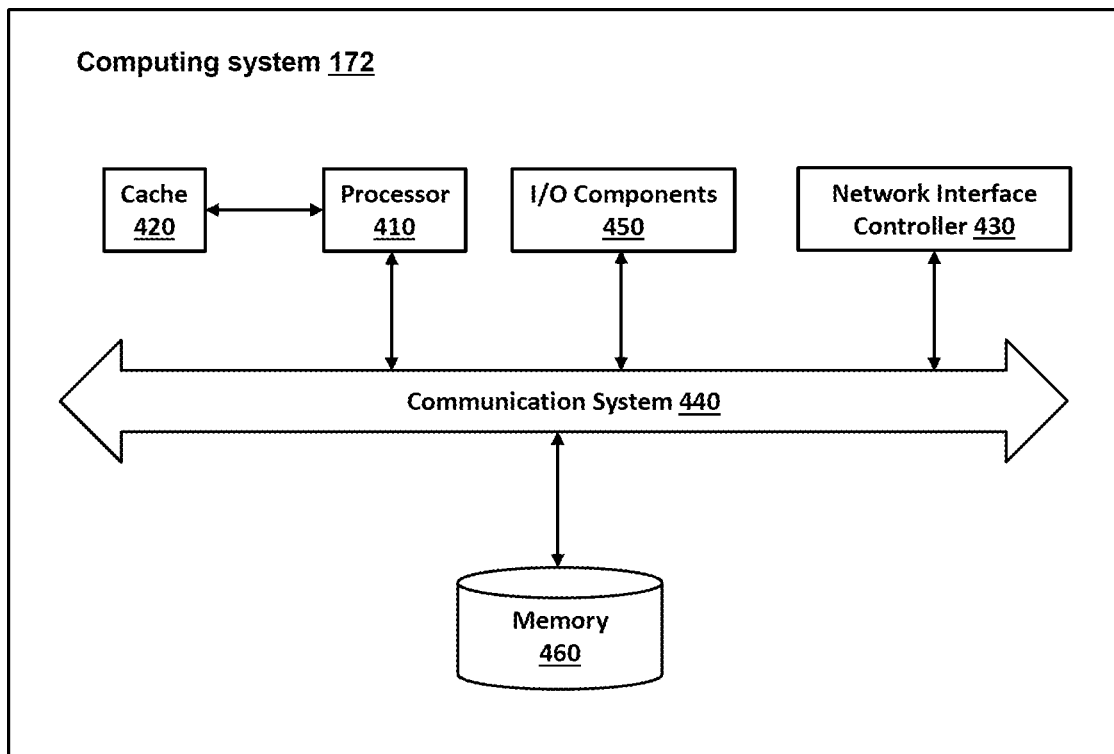
FIG. 4 is a block diagram illustrating an example of a computing system according to some implementations.

FIG. 4 is a block diagram illustrating an example of a computing system according to some implementations.

Referring to FIG. 4, the illustrated example computing system 172 includes one or more processors 410 in communication, via a communication system 440 (e.g., bus), with memory 460, at least one network interface controller 430 with network interface port for connection to a network (not shown), and other components, e.g., an input/output ("I/O") components interface 450 connecting to a display (not illustrated) and an input device (not illustrated). Generally, the processor(s) 410 will execute instructions (or computer programs) received from memory. The processor(s) 410 illustrated incorporate, or are directly connected to, cache memory 420. In some instances, instructions are read from memory 460 into the cache memory 420 and executed by the processor(s) 410 from the cache memory 420.

In more detail, the processor(s) 410 may be any logic circuitry that processes instructions, e.g., instructions fetched from the memory 460 or cache 420. In some implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 460.

The cache memory 420 is generally a form of computer memory placed in close proximity to the processor(s) 410 for fast read times. In some implementations, the cache memory 420 is part of, or on the same chip as, the processor(s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, a computing system 172 has multiple network interfaces controlled by a single controller 430. In some implementations, a computing system 172 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 430 implements one or more network protocols such as Ethernet. Generally, a computing device 172 exchanges data with other computing devices via physical or wireless links through a network interface. The network interface may link directly to another device or to another device via an intermediary device, e.g., a network device such as a hub, a bridge, a switch, or a router, connecting the computing device 172 to a data network such as the Internet.

The computing system 172 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 410 with high precision or complex calculations.

Figure 5:
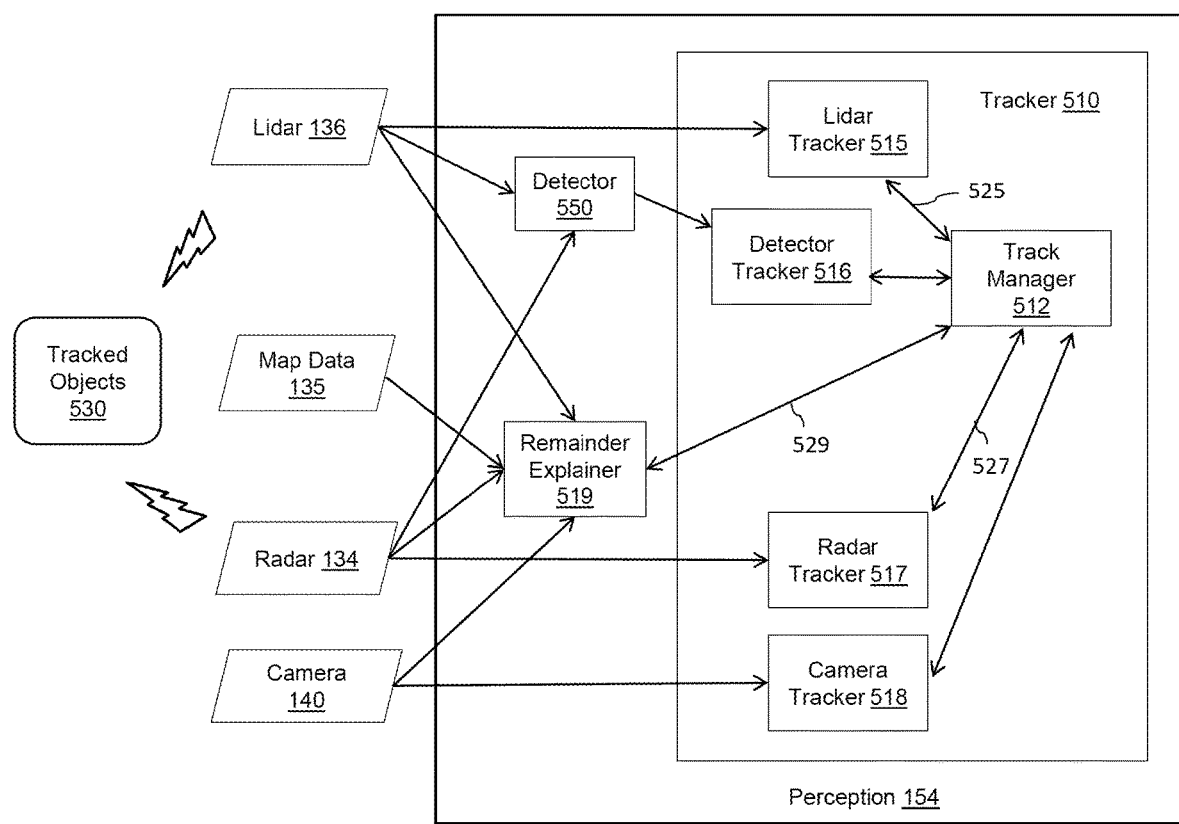
FIG. 5 is a block diagram illustrating an example of a perception subsystem according to some implementations.

III. System and Methods for Generating Information on Remainder of Measurement Using Sensor Data FIG. 5 is a block diagram illustrating an example of a perception subsystem according to an implementation of the present disclosure.

The perception subsystem 154 is responsible for detecting, classifying, and tracking actors and objects within the environment surrounding the vehicle 100 (see FIG. 1). In some implementations, the perception subsystem 154 may include at least one of a remainder explainer 519, a detector 550 (or a plurality of detectors 550) and a tracker 510. In some implementations, the perception subsystem 154 can include multiple detectors that receive sensor data from respective sensors.

The detector 550 is principally responsible for determining and/or detecting objects within the environment surrounding the vehicle based on sensor data received from sensors. In some implementations, the detector 550 may receive data from sensors (e.g., LIDAR data from the lidar sensor 136 or a plurality of lidar sensors 136, radar data from the radar sensor 134 or a plurality of radar sensors 134) and process the received sensor data to determine and/or detect objects. In some implementations, the detector 550 may be one or more detectors corresponding to respective different kinds of sensors, or a single detector receiving data from different kinds of sensors, or multiple detectors each receiving data from different kinds of sensors. In some implementations, the detector 550 may be configured to classify an object into a particular category based on sensor data received from the one or more sensors (e.g., using one or more machine learning models to classify an object into a particular category). In some implementations, the detector 550 may determine features related to an object based on sensor data. For example, the detector 550 can determine a size, a shape, a velocity, or a moving direction of an object. In some implementations, the detector 550 may output the determined classification or the determined features of an object to be input to the tracker 510.

In some implementations, output from the detector 550 may include data relating to detections and/or data relating to predictions. Detections data may include 3 dimensional (3D) oriented boxes for detected objects (e.g., pedestrians, cyclists, vehicles, etc.). In some implementations, motorcyclists may be labeled as vehicles. In some implementations, the detector 550 may perform detections inside a spatial (or raster) grid of predetermined dimensions which may contain a plurality of cells. Predictions data may include 2 dimensional (2D) spatial grids containing information about objects for which the detector does not obtain sufficient or complete shape representations or motion models. The grids may contain at least one of an obscurant grid, a velocity grid or a vegetation grid. The obscurant grid may represent a probability that each cell is an obscurant (e.g., rain, snow, fog, smoke, exhaust, etc.). The velocity grid may represent a ballistic 2D velocity vector indicating how objects contained in each cell are moving. The vegetation grid may represent a probability that each cell is vegetation. In some implementations, the velocity grid and the vegetation grid may not yet be predicted by the detector. In some implementations, all grids may contain information relating to sensor data contained in each cell (e.g., min/max z values, timestamps, measured from a lidar sensor). In some implementations, the contents of a grid may be used by a sensor buffer to remove spurious lidar data (e.g., obscurant grid), tag generics (e.g., moving matter apart from tracked objects) with velocity values (e.g., velocity grid), or inform a static raster based on the contents of a grid (e.g., vegetation grid).

The tracker 510 is principally responsible for tracking objects (e.g., objects 530) within the environment surrounding the vehicle 100. In some implementations, the tracker 510 may be configured to associate consecutive sensor observations (e.g., radar points in cloud points measured by a radar sensor) of an object and generate a track based on the sensor observations.

In some implementations, the tracker 510 may include a track manager 512 which initiates and/or updates a track associated with the object based on changes of the target objects. In some implementations, the tracker 510 may include a radar tracker 517, while in some implementations the radar tracker 517 may be separate from the tracker 510. In some implementations, where the radar measurement data are encoded in a certain format, the radar tracker 517 can decode and convert radar measurement data (e.g., radar points received from the radar sensor 134 or a plurality of radar sensors 134) into a different format. For example, the radar tracker 517 can add certain channels to the format of the radar measurement data such that additional data can be associated with the additional channels that are included in the different format. In some implementations, the radar tracker 517 determines tracks of different objects (e.g., present position and velocity of different objects), and outputs radar points associated with tracks of different objects to be input to the track manager 512. In some implementations, in response to a request for up-to-date radar measurement data from the track manager 512, the radar tracker 517 may be configured to output track data based on radar points of up-to-date radar measurements, to be input to the track manager 512. In some implementations, the radar tracker 517 may be configured to send updates 517 to the track manager 512 to inform a new position and a range rate of a track, which can be integrated in the track manager 512 or the tracker 510.

In some implementations, the tracker 510 may include a detector tracker 516 which receives detection data from the detector 550 and outputs data of a track of the newly detected object (e.g., position and velocity data) to be input to the track manager 512. In some implementations, the detector tracker 516 may be separate from the tracker 510.

In some implementations, the detector tracker 516 may associate detections with existing tracks to update position, velocity and extents, for example, which are integrated in the track manager 512 or the tracker 510.

In some implementations, the tracker 510 may include a lidar tracker 515 which converts lidar measurement data (e.g., reflected laser measured by the lidar sensor 136 or a plurality of lidar sensors 136) to points or a surface in a 3D environment, and output the points or surface to be input to the track manager 512. In some implementations, the lidar tracker 515 may be separate from the tracker 510. In some implementations, the lidar tracker 515 may send updates 525 to the track manager 512 to inform visibility information (via ray tracing, for example) on if a track really exists in the world. For example, using visibility information such as the ray hits/misses, the tracker 510 may remove tracks that are not supported by lidar data (e.g., remove tracks spawned from radar returns on overpasses). The tracker 510 may include a camera tracker 518 which converts images captured by a camera (e.g., the camera 140 or a plurality of cameras 140) to points or a surface in a 3D environment, and output the points or surface to be input to the track manager 512. In some implementations, the camera tracker 518 may be separate from the tracker 510.

In some implementations, the remainder explainer system 519 which receives (1) track data 529 of an object from the track manager 512, (2) new measurement data from at least one sensor (e.g., sensors 134, 136, 140), and/or (3) map data 135 from a map or atlas. The remainder explainer system 519 may use a machine learning model (e.g., training the model 212 by the training engine 214 in FIG. 2) that partitions sensor data into "object" (e.g., vehicles, pedestrians and cyclists) and "obscurant" (something motion-planning should ignore). The remainder explainer system 519 may explain the sensor measurements that are not yet explained by other components of the perception system (e.g., detectors 550 or trackers 512, 515, 516, 517, 518). In some implementations, instead of predicting obscurants with labels and using the prediction results to explain away sensor data, the remainder explainer system 519 may predict the opposite, e.g., what is out there in the world that needs to be paid attention to. For example, the remainder explainer system 519 may label out all tangible objects in the scene, with some attributes tagged for the objects. The rest of the returns then, by-default, may fall into the "don't care" category, within which the system may optionally label out ground/obscurant explicitly as desired. In some implementation, the remainder explainer system 519 may track "generics" as generic tracks and output generic tracks 529 to the track manager 512 so that a vehicle is controlled based on the generic tracks. In some implementations, generics may include FODs (Foreign Objects Or Debris) classes not handled by a tracker: e.g., animals, debris, balls, barrier, etc.

Figure 6:
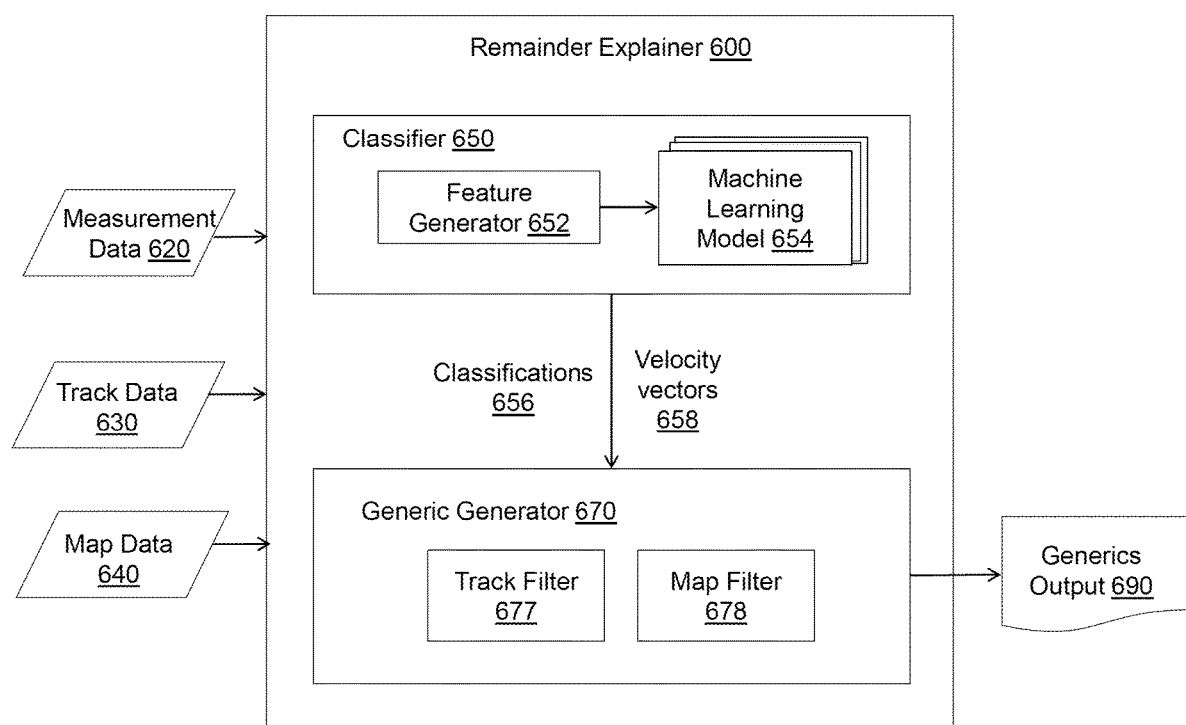
FIG. 6 is a block diagram illustrating an example of a remainder explainer system according to some implementations.

FIG. 6 is a block diagram illustrating an example of a remainder explainer system according to an implementation of the present disclosure.

In some implementations, a remainder explainer system 600 may include (1) a classifier 650 configured to perform a process of classification of measurement data 620 and (2) an generic generator 670 configured to perform a process of generating generic tracks as generic output 690. The remainder explainer system 600 may receive, as input, measurement data 620, track data 630, and/or map data 640. The measurement data 620 may be data received from sensors (e.g., lidar 136, radar 134, camera 140 shown in FIG. 5). In some implementations, the measurement data 620 may represent one of a range view or a bird's eye view relative to an autonomous vehicle (e.g., vehicle 100 in FIG. 1). The map data may be data from a map or atlas (e.g., data 135 in FIG. 5). The generic output 690 (and/or potential generics 674) may be (1) an output view including a plurality of cells or (2) 3-D voxel map.

In some implementations, the classifier 650 may include (1) a feature generator 652 configured to generate a set of features and (2) one or more ML models (e.g., neural networks) 654 configured to classify the measurement data into "object" or "obscurant" based on the set of features. In some implementations, the set of features may include range image features (e.g., features relating to a threshold range of proximity), point-wise features (e.g., features relating to objects such as vehicle, cyclist, pedestrian, etc., or known obscurants such as rain, snow, fog, smoke, exhaust, etc.), and/or filtering features (e.g., features relating to ground information, point counts, and ray-tracing statistics). In some implementations, the classifier 650 may output classifications or classification data 656 and velocity vectors 658.

In some implementations, instead of predicting obscurants with labels and using the prediction result to explain away sensor data, the classifier 650 may label out and predict the opposite, e.g., what is out there in the world that needs to be paid attention to. For example, the classifier 650 may label out all tangible objects in the scene (e.g., vehicle, passenger, cyclist, etc.), with some attributes tagged for the objects. The rest of the returns then by-default may fall into the "don't care" or "unexplained" category, within which the classifier 650 may optionally label out ground/obscurant explicitly as desired. For example, the classifier 650 may further label out known obscurants such as rain, snow, fog, smoke, exhaust so that the rest of the returns will fall into "don't care" or "unexplained" category as an output of the classifier.

In some implementations, the classifier 650 may use a labelling scheme that only considers or detects generic objects on-road, e.g., a scheme that only labels out generic objects within a certain distance from the road region boundary, and the classifier 650 may perform inference only on such regions as well. Using the labelling scheme, for static objects, the classifier 650 may only consider or detect those on-road because a planning system can treat the road region boundary as something the autonomous vehicle (AV) should never go beyond, so reporting static objects beyond the road region boundary will not change AV behaviors. In some implementations, the classifier 650 can provide information on off-road static objects with a precision lower than that of on-road objects (e.g. it may report false positive static objects) because AV behaviors will not be affected.

In some implementations, the classifications or classification data 656 output from the classifier 650 may include unexplained sensor data (as potential generics) which are not classified as known objects (e.g., vehicle, cyclist, pedestrian) or known obscurants (e.g., rain, snow, fog, smoke, exhaust). In some implementations, the classifications or classification data 656 output from the classifier 650 may include sensor data which are classified as known objects (e.g., vehicle, cyclist, pedestrian) as well as unexplained sensor data.

In some implementations, the velocity vectors 658 output from the classifier 650 may be velocity vectors of the potential generics. In some implementations, the classifier 650 may be configured to predict velocity or location of a potential generic. In some implementations, the classifier 650 may predict a velocity vector of a potential generic by (1) taking or inputting feature vectors (e.g., feature vectors extracted from an "unexplained" output of the classifier 650)

at a current time and a previous time, (2) applying techniques of vision or machine learning (e.g., neural network), and (3) outputting a prediction result as velocity vectors.

The generic generator 670 may take inputs of classification 656 and a velocity vector 658 from the classifier 650, and generate (1) an output view including a plurality of cells or (2) 3-D voxel map (e.g., voxel of 25 cm). In some implementations, the generic generator 670 may output a rasterized view and/or a grid view. In some implementations, the generic generator 670 may (1) generate an output view (e.g., a rasterized view or 3-D voxel map), (2) take or input a location of the output view, e.g., an (x, y, z) coordinate, and (3) check with a result of the classification process on that location. If the location is already explained (e.g., object or known obscurant exists) by the classification process, the generic generator 670 may throw away (discard or remove or delete or ignore) the output view of that location. If the location is unexplained, the generic generator 670 may aggregate the classification data 656 (e.g., point-by-point sensor data) and velocity vectors 658 on the corresponding location into the output view. In some implementations, the generic generator 670 may perform the aggregation by averaging subsets of the classification data 656 and the velocity vectors 658 (e.g., subsets corresponding to a particular location).

Generic tracks may have instantaneous dynamics, but no cycle to cycle consistency.

In some implementations, the classifier 650 may house or store a range-view model that classifies points into object(s) or obscurant(s). In some implementations, after performing a classification or a clustering (e.g., some naive clustering), the classifier 650 may send (or ship) the clustering or classification output to the generic generator 670. The generic generator 670 may receive the output (e.g., unexplained sensor data) from the classification process and fuse or combine the received output with a latest track output, creating "generic" tracks from explanations that are not explained by tracks. The generic generator 670 may apply a range view-based model to lidar points to perform or optimize a few tasks, for example, multi-class detection, multi-class trajectory prediction, lidar point segmentation, and class agnostic detection. In some implementations, the generic generator 670 may (1) take as inputs sensor-complete data (e.g., camera/radar/lidar) and a map, (2) output generic tracks with instantaneous velocity, and (3) handle multiple objects in z direction (e.g., object under overpass). For example, the generic generator 670 may have an output rate of 20 Hz which matches a track output frequency. The size of smallest detected objects may be 20 cm if the output range is less than 150 m, and 50 cm if the output range is less than 300 m. The generic generator 670 can cover required ranges (e.g., 150 m or 300 m), report objects (as generics) from road including jersey barriers, and/or report moving objects that may enter the road, in the form of generic tracks.

The generic generator 670 may include a track filter 677 and/or a map filter 678 to perform post-processing to reduce false positives. The track filter 677 may explain out or filter out or de-duplicate potential generic tracks based on the track data 630. For example, the track filter 677 may compare a potential generic track (e.g., a track based on either unexplained sensor data and/or explained sensor data classified as known objects) to track data (e.g., track data from track manager 512 in FIG. 5). In some implementations, the track filter 677 may compare properties of sensor data of a potential generic track (e.g., location information or velocity vector) to corresponding properties of track data 630 (e.g., track data from track manager 512 in FIG. 5). If the track data 630 can explain, based on a result of the comparison, a potential generic track or a portion thereof, the track filter 677 may filter out or remove or de-duplicate the explained potential generic track or the explained portion.

The map filter 678 may explain out or filter out or de-duplicate the potential generic tracks based on the map data 640 (e.g., road boundary information). For example, the map filter 678 may compare a potential generic track to map data (e.g., map data 135 in FIG. 5). If the map data 640 can explain, based on a result of the comparison, a potential generic track or a portion thereof as a ground surface, the map filter 678 may filter out or remove or de-duplicate the explained potential generic track or the explained portion. In some implementations, the generic generator 670 may include other filters including (1) ground plane filter (e.g., filters with tilted ground plane with different inclination angles, as well as types), (2) raytracing classification filter (e.g., classification by modeling light transport), (3) multipath classification filter (e.g., classification by detecting multipath ghost target images), (4) lidar point erosion filter (e.g., removing pixels on object boundaries), and/or (5) thresholding number of points. In some implementations, the post-processing or filtering can be performed inside the ML model (e.g., classifier 650) as a weight-free component (e.g., a component not learned). In some implementations, the post-processing or filtering can be performed inside the ML model as a weight-free component (e.g., a component not learned). In some implementations, filtering by the map filter 678 may be performed prior to filtering by the track filter 677.

In some implementations, the remainder explainer system 600 can only report objects that can cause or receive "harm" in which "harm" is platform agnostic. In some implementations, the remainder explainer system 600 can classify sensor data (e.g., measurement data 620 in FIG. 6) as corresponding to a vulnerable actor or non-vulnerable actor, and can only report objects corresponding to the vulnerable actor. In some implementations, the classifications or classification data 656 output from the classifier 650 may include classifications corresponding to (1) object or non-object, (2) vulnerable or non-vulnerable, and/or (3) harmful or non-harmful. The remainder explainer system 600 can use reported object size to decide on "straddle ability." In some implementations, the remainder explainer system 600 can output information in form of a static raster. The remainder explainer system 600 can generate output in such a high precision to satisfy the requirement of the perception system which has low tolerance for false positives at highway speeds. For example, the remainder explainer system 600 can not only filter out "obscurants", but also provide reasonable dynamics estimates. The remainder explainer system 600 also can generate output with a high recall. For example, the remainder explainer system 600 can report all objects that may cause "harm" and the perception system can use reported object size to decide "straddle ability." The remainder explainer system 600 also can generate output in a long range. For example, outputs can have a range of 160 m behind for merges, a range of 200 m ahead for stopping for any obstacle, or a range of 300 m ahead for sufficient time to lane change.

In some implementations, the remainder explainer system can have engineered filters that are used in parallel with the machine learning model to determine object/non-object classifications. For example, the engineered filters may include erosion filter, multipath classification filter, ground plane filter, and/or number of point filter.

Figure 7A:
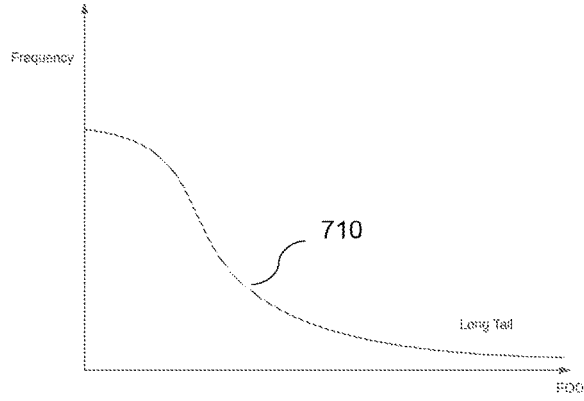
FIG. 7A is a diagram illustrating a distribution of different kinds of foreign objects or debris (FODs)
Figure 7B:
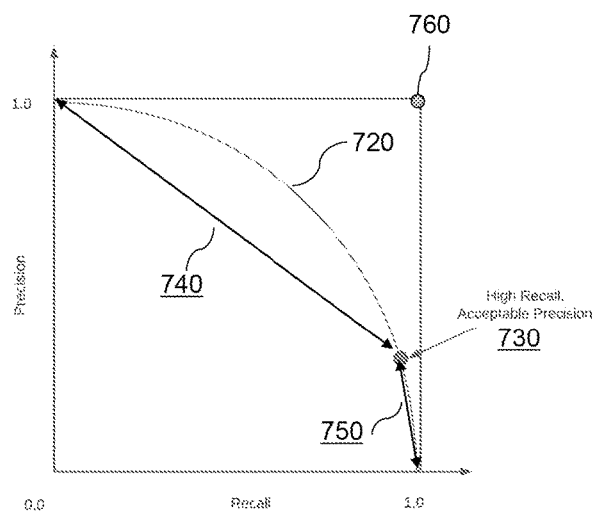
FIG. 7B is a diagram illustrating a precision/recall (PR) curve for different operating points of a remainder explainer system according to some implementations.

FIG. 7A is a diagram illustrating a distribution of different kinds of foreign objects or debris (FODs). FIG. 7B is a diagram illustrating a precision/recall (PR) curve for different operating points of a remainder explainer system according to some implementations.

One concern in a remainder explainer system performing filtering in a post-processing step (e.g., track filter 677 or map filter 678 in FIG. 6)) is how the system can keep a high recall on generics. FIG. 7A shows the distribution 710 of different kinds of FODs that AV needs to be aware of on the road. The distribution shown in FIG. 7A has a long tail of FODs that are rare events. The remainder explainer system may need a significant amount of labels to cover these rare events.

FIG. 7B shows a precision/recall (PR) curve showing a trade-off between precision and recall for different operating points of a remainder explainer system. There are two types of existing metrics related to the remainder explainer system: (1) stuff metrics and (2) generic metrics. Stuff metrics can measure the performance of obscurant prediction and velocity prediction, whereas generic metrics measures the overall recall of generics based on heuristic-based auto-generated labels. In the remainder explainer system, the output of a model and the published generics can be measured separately. The PR curve shown in FIG. 7B is obtained based on the stuff metrics.

After training a learning/inference model (e.g., neural network), an operation point on the PR curve may be picked or chosen. For example, an operation point with high recall and "acceptable" precision (e.g., point 730 in FIG. 7B) may be chosen. A delta from the operation point to 100% recall (e.g., 750 in FIG. 7B) corresponds to an amount of false negatives. A delta from the operation point to 100% precision (e.g., 740 in FIG. 7B) corresponds to an amount of false positives. As the operation point approaches 100% recall, the remainder explainer system would report too many false positive generics which may stop AV from operating. On the other hand, as the operation point approaches 100% precision, the remainder explainer system would report too many false negative generics which may stop AV from explaining or predicting "real" generics. This is the trade-off that exists in all classification schemes for the remainder explainer system.

In some implementations, the remainder explainer system can keep pushing the PR curve to the top right corner (e.g., an operation point 760 with the same degree of recall and precision in FIG. 7B). But, one challenge in using a learning/inference model (e.g., Artificial Neural Network (ANN)) is to prevent the worst case from happening. For example, AV should "never" run into a wall. To prevent such false negatives from happening, an operation point with high recall and "acceptable" precision (e.g., point 730 in FIG. 7B) may be chosen. Such high recall and "acceptable" precision can be implemented by utilizing a set of engineered algorithms plus obscurant prediction. To name a few, the engineered algorithms include ground plane filtering (e.g., filters with tilted ground plane with different inclination angles, as well as types), raytracing classification (e.g., classification by modeling light transport), multipath classification (e.g., classification by detecting multipath ghost target images), lidar point erosion filter (e.g., removing pixels on object boundaries), and thresholding number of points.

Figure 8:
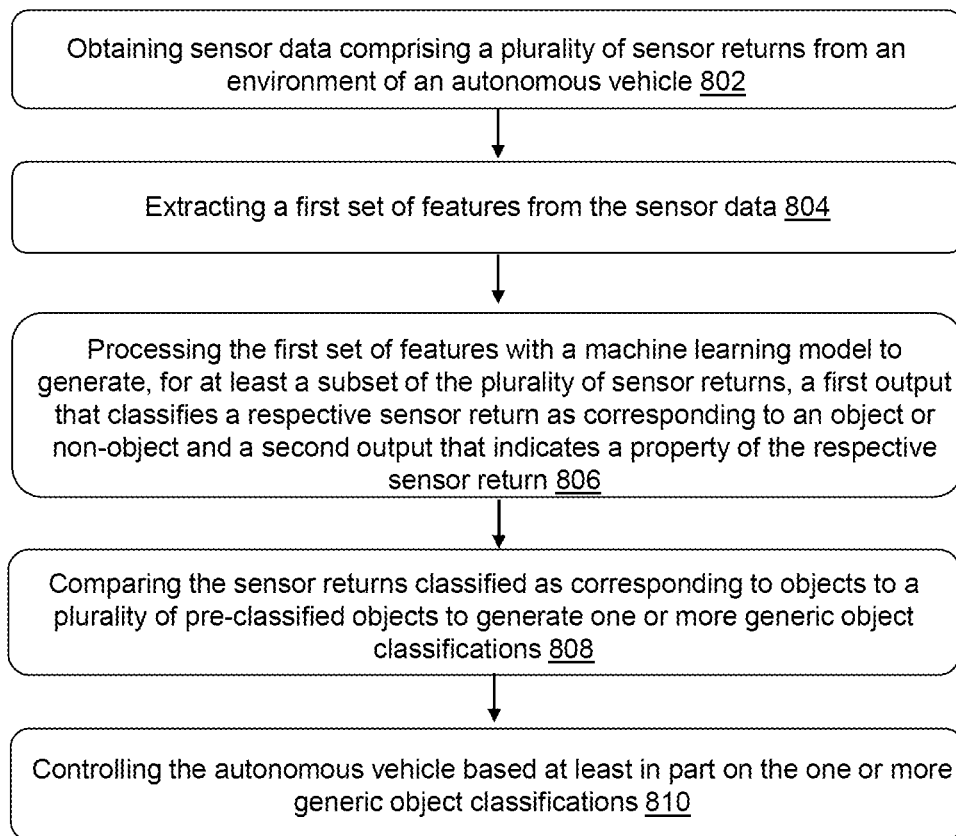
FIG. 8 is a flowchart illustrating an example methodology for generating information on remainder of measurement according to some implementations.

FIG. 8 is a flowchart illustrating an example method for generating information on a remainder of measurements according to some implementations.

In some implementations, the method may be performed by a vehicle computing system (e.g., the perception system 154, the remainder explainer 519 in FIG. 5, the remainder explainer system 600 in FIG. 6) comprising one or more processors (e.g., processor 410 in FIG. 4) and one or more memories (e.g., memory 460 in FIG. 4) operably coupled with the one or more processors.

In this example method, the process begins in operation 802 in which the remainder explainer system or the one or more processors thereof obtains sensor data (e.g., lidar data 136, radar data 134, camera data 140 in FIG. 5; measurement data 620 in FIG. 6) including a plurality of sensor returns from an environment (see a perception sub-system in FIG. 5) of an autonomous vehicle (e.g., vehicle 100 in FIG. 1). In some implementations, the plurality of sensor returns may represent one of a range view or a bird's eye view relative to the autonomous vehicle.

In operation 804, the remainder explainer system or the one or more processors thereof (e.g., feature generator 652 of classifier 650 in FIG. 6) may extract a first set of features from the sensor data. In some implementations, the first set of features may include range image features (e.g., features relating to a threshold range of proximity), point-wise features (e.g., features relating to objects such as vehicle, cyclist, pedestrian, etc., or known obscurants such as rain, snow, fog, smoke, exhaust, etc.), and/or filtering features (e.g., features relating to ground information, point counts, and ray-tracing statistics).

In operation 806, the remainder explainer system or the one or more processors thereof (e.g., classifier 650 in FIG. 6) may process the first set of features with a machine learning model (e.g., machine learning model 654 in FIG. 6) to generate, for at least a subset of the plurality of sensor returns, a first output (e.g., classifications 656 in FIG. 6) that classifies a respective sensor return as corresponding to an object or non-object and a second output (e.g., velocity vectors 658 in FIG. 6) that indicates a property of the object. In some implementations, the property of the object may include at least one of predicted velocity information (e.g., velocity vectors 658 in FIG. 6) or predicted location information associated with the respective sensor return.

In some implementations, in processing the first set of features, the remainder explainer system or the one or more processors (e.g., classifier 650 in FIG. 6) may be configured to generate, for at least the subset of the plurality of sensor returns, a third output (e.g., classifications 656 in FIG. 6) that classifies the respective sensor return as corresponding to a vulnerable actor or non-vulnerable actor.

In operation 808, the remainder explainer system or the one or more processors thereof (e.g., generic generator 670 or track filter 677 in FIG. 6) may compare the sensor returns classified as corresponding to objects (e.g., potential generic tracks based on classifications 656 in FIG. 6) to a plurality of pre-classified objects (e.g., track data 630 based on pre-classified objects in FIG. 6) to generate one or more generic object classifications (e.g., generating generic tracks based on generic object classifications).

In some implementations, in comparing the sensor returns, the remainder explainer system or the one or more processors (e.g., track filter 677 in FIG. 6) may be configured to determine that the respective sensor return does not correspond to any of the plurality of pre-classified objects. In response to the determination, the one or more processors may be configured to classify the respective sensor return as corresponding to a generic object. The generic object may be debris. In some implementations, the generic object may be ground, animals, debris, balls, barrier, etc. Referring to FIG. 6, if the track data 630 can explain, based on a result of the comparison, a potential generic track or a portion thereof, the track filter 677 may filter out or remove or de-duplicate the explained potential generic track or the explained portion.

In some implementations, in comparing the sensor returns, the remainder explainer system or the one or more processors (e.g., track filter 677 in FIG. 6) may be configured to compare the property of the object to corresponding properties of the plurality of pre-classified objects. For example, referring to FIG. 6, the track filter 677 may compare properties of sensor data of a potential generic track (e.g., location information or velocity vector) to corresponding properties of track data 630 (e.g., track data from track manager 512 in FIG. 5).

In some implementations, the remainder explainer system or the one or more processors (e.g., generic generator 670 in FIG. 6) may be further configured to prior to comparing the sensor returns, aggregate the first and second outputs of the plurality of sensor returns into a plurality of three dimensional (3-D) voxels. In the aggregating, the one or more processors may be configured to average subsets of the first and second outputs of the plurality of sensor returns. For example, referring to FIG. 6, if sensor data at a particular location is unexplained, the generic generator 670 may aggregate the classification data 656 (e.g., point-by-point sensor data) and velocity vectors 658 on the particular location into an output view including a plurality of 3-D voxels. In some implementations, the generic generator 670 may perform the aggregation by averaging subsets of the classification data 656 and the velocity vectors 658 (e.g., subsets corresponding to the particular location).

In some implementations, the remainder explainer system or the one or more processors (e.g., track filter 677 in FIG. 6) may be further configured to filter, prior to the comparing, the plurality of sensor returns based at least in part on map data. In some implementations, filtering by the map filter 678 may be performed prior to filtering by the track filter 677. The map data may include road boundary information. In the filtering, the one or more processors may be configured to filter ground surface information. For example, referring to FIG. 6, the map filter 678 may compare a potential generic track with map data (e.g., map data 135 in FIG. 5). If the map data 640 can explain, based on a result of the comparison, a potential generic track or a portion thereof as a ground surface, the map filter 678 may filter out or remove or de-duplicate the explained potential generic track or the explained portion.

In operation 810, the remainder explainer system or the one or more processors thereof (e.g., generic generator 670 in FIG. 6) may control the autonomous vehicle based at least in part on the one or more generic object classifications (e.g., generic tracks based on generic object classifications). For example, referring to FIG. 6, the generic generator 670 may provide generic tracks (which are generated based on generic object classifications) to a track manager (e.g., track manager 512) to an autonomous vehicle control system (e.g., vehicle control system 120 in FIG. 1) such that a vehicle is controlled based on generic tracks.

IV. Performance Issues Relating to Remainder Explainer System

In some implementations, the classification process and the generic generation process of a remainder explainer system may be two independent processes but may share models (e.g., ML models). One advantage of independent processes is that if one process fails, the other process can operate thereby improving reliability and availability of the perception system. Another advantage of independent processes is that such an implementation can give flexibility to either module in terms of processing speed or frequency and that each module does not have to be synchronized with the other module. For example, the generic generation process can run as fast as a tracker, while the classification process can run slower. In this manner, the remainder explainer system can immediately cover for a false negative from the tracker, without having to wait for a new run of the classification process.

One challenge of a perception system is to satisfy publishing (or reporting) frequency and latency requirements, under the constraint of compute resources. In some implementations, a main classification system and a remainder explainer system may be two independent processes, one of which provides an input to the other. For example, the main classification system may provide an input to the remainder explainer system, or vice versa. In some implementations, there are two callbacks (or call-after functions) corresponding the main explainer system and the remainder explainer system. In some implementations, the callback for the main explainer system performs the classification of lidar points, triggered by new data coming in, while the callback for the remainder explainer system performs the explanation of lidar points and the generation of generics, triggered by a new track bundle coming in. In some implementations, the two callbacks can run asynchronously as two independent threads. However, the publish/subscribe overhead can be expensive due to the density of prediction.

In some implementations, the remainder explainer callback (or process) can satisfy several requirements: (1) publishing frequency, (2) latency and/or (3) GPU availability. For example, a particular value of publishing frequency may be required as it is bounded by the perception provider protocol. In other words, an explanation may need to be provided according to the particular value of publishing frequency. In some cases, the window of data for which explanation is provided should be as low latency as possible, but stale data of up to a predetermined latency should be acceptable. To satisfy this publishing frequency requirement, the remainder explainer callback may maintain a buffer of explanations, and maintain the explanation with update/purge/etc. as new inference happens, explanation becomes stale, etc.

Latency may be lower bounded by a frequency of operating lidar's rolling shutter plus inference time of a model (e.g., neural network), under the assumption that per-sweep batch processing is performed. In some implementations, the remainder explainer callback can reduce the latency with stream processing, at the expense of heavier overall compute. With stream processing, latency can be lower bounded by lidar packet latency (which is relatively very small) plus packet processing time (which also can be made very small). Under the nominal perception case, latency may be less of a concern in the near-term as most generic objects are static. Eventually, improving latency will be an inherent piece of improving the performance as there will be moving generic objects and nominal track false negatives.

GPU availability of a predetermined percentage of time may be required as given the existence of other models or processes, a GPU will be available to the remainder explainer callback for the predetermined percentage of the time. The scheduling can be challenging depending on the I/O pattern of other models sharing the GPU. For example, the remainder explainer callback may eagerly run inference on a slice of lidar points as they come in, but a tracker may have just kicked in and blocked for some amount of time. To make scheduling efficient, models sharing a GPU may need to be running at comparable cadence. In some implementations, two models sharing a GPU can run at comparable cadence by both models performing batch processing at a predetermined frequency, or both models performing stream processing with a shared process queue.

In some implementations, GPU availability may be satisfied by setting a number of GPU threads (e.g., gpu_thread_limit) for models or processes co-located to the same device to facilitate concurrent processing of the remainder explainer callback and other models on a GPU. This may guarantee that any particular model or process will not take up more SMs (streaming multiprocessors) than the configured gpu_thread_limit, and the rest of the available SMs can be utilized for other processes. In some implementations, the gpu_thread_limit of a tracker can be set to a predetermined percentage (e.g., $\alpha$ %), so that (100-$\alpha$)% is available for use by the remainder explainer callback. In this manner, the remainder explainer inference model will not be blocked by the tracker for its entire inference cycle, so the remainder explainer inference model and the tracker can run at different cadences more efficiently, thereby improving the GPU utilization rate and achieving the target inference frequency with more compute headroom. In some implementations, there is no control over the scheduling of the processes, so that there is no guarantee of the behavior of the processes. For example, another inference process (by radar or camera) and the remainder explainer callback may be interleaved, so that they both run at a predetermined frequency and each takes up a predetermined amount of the inference time. However, there is no guarantee that the inference of the processes will happen in an interleaved way.

In some implementations, the remainder explainer callback (or process) may perform the inference on CPU using a single instruction multiple data (SIMD) library, especially for heterogeneous network designs that GPU does not have a strong edge over.

Considering all factors, in some implementations, the main explainer call back and the remainder explainer call back may be run in two independent threads. In some implementations, the whole explainer module can be split into two modules that can be run in two independent threads. In some implementations, inter-process communication (IPC) may be performed between two threads using a ring buffer instead of passing a protocol buffer, especially if large message size is a concern. In some implementations, because a ring buffer is not logged, to run offline a producer of a ring buffer may be run with a consumer. In some implementations, gpu_thread_limit can be used to divide the availability of a GPU, so that any single model or process will not block other models or processes from processing. Batch processing of lidar points may be performed at a predetermined frequency. Computation headroom can be confirmed by experiments with configuration of gpu_thread_limit. The remainder explainer callback (or process) can be run as tracks come in on the latest inference result.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
   (a) obtaining sensor data comprising a plurality of sensor returns from an environment of an autonomous vehicle, wherein the plurality of sensor returns includes at least one of lidar data, radar data, or camera data;
   (b) extracting a first set of features from the sensor data;
   (c) processing the first set of features with a machine learning model to generate, for at least a subset of the plurality of sensor returns, a first output that classifies a respective sensor return as corresponding to an object or non-object and a second output that indicates a property of the object, wherein the non-object includes at least one of rain, snow, fog, smoke, or exhaust;
   (d) comparing the sensor returns classified as corresponding to objects to a plurality of pre-classified objects to generate one or more generic object classifications; and
   (e) controlling the autonomous vehicle based at least in part on the one or more generic object classifications, wherein (d) comprises:
   (f) determining that the respective sensor return does not correspond to any of the plurality of pre-classified objects; and
   in response to (f), classifying the respective sensor return as corresponding to a generic object.

2. The method of claim 1, further comprising, prior to (d), filtering the plurality of sensor returns based at least in part on map data.

3. The method of claim 2, wherein the map data comprises road boundary information.

4. The method of claim 2, wherein the filtering comprises filtering ground surface information.

5. The method of claim 1, wherein the generic object is debris.

6. The method of claim 1, wherein (d) comprises comparing the property of the object to corresponding properties of the plurality of pre-classified objects.

7. The method of claim 1, further comprising, prior to (d), aggregating the first and second outputs of the plurality of sensor returns into a plurality of three dimensional (3-D) voxels.

8. The method of claim 7, wherein the aggregating comprises averaging subsets of the first and second outputs of the plurality of sensor returns.

9. The method of claim 1, wherein the plurality of sensor returns represent one of a range view or a bird's eye view relative to the autonomous vehicle.

10. The method of claim 1, wherein the property of the object includes at least one of predicted velocity information or predicted location information associated with the respective sensor return.

11. The method of claim 1, wherein (c) comprises generating, for at least the subset of the plurality of sensor returns, a third output that classifies the respective sensor return as corresponding to a vulnerable actor or non-vulnerable actor.

12. A system comprising one or more processors and one or more memories operably coupled with the one or more processors, wherein the one or more memories store instructions that, in response to the execution of the instructions by one or more processors, cause the one or more processors to perform the following operations:
   (a) obtaining sensor data comprising a plurality of sensor returns from an environment of an autonomous vehicle, wherein the plurality of sensor returns includes at least one of lidar data, radar data, or camera data;
   (b) extracting a first set of features from the sensor data;
   (c) processing the first set of features with a machine learning model to generate, for at least a subset of the plurality of sensor returns, a first output that classifies a respective sensor return as corresponding to an object or non-object and a second output that indicates a property of the object;
   (d) comparing the sensor returns classified as corresponding to objects to a plurality of pre-classified objects to generate one or more generic object classifications; and (e) controlling the autonomous vehicle based at least in part on the one or more generic object classifications, wherein in performing (d), the one or more processors are configured to:

(f) determine that the respective sensor return does not correspond to any of the plurality of pre-classified objects; and in response to (f), classify the respective sensor return as corresponding to a generic object, wherein the autonomous vehicle is controlled based on a sensor return classified as corresponding to an object, and the autonomous vehicle is not controlled based on a sensor return classified as corresponding to a non-object.

13. The system of claim 12, wherein the one or more processors are further configured to:

prior to (d), filter the plurality of sensor returns based at least in part on map data.

14. The system of claim 13, wherein the map data comprises road boundary information.

15. The system of claim 13, wherein in the filtering, the one or more processors are configured to filter ground surface information.

16. The system of claim 12, wherein the generic object is debris.

17. The system of claim 12, wherein in performing (d), the one or more processors are configured to compare the property of the object to corresponding properties of the plurality of pre-classified objects.

18. The system of claim 12, wherein the one or more processors are further configured to:

prior to (d), aggregate the first and second outputs of the plurality of sensor returns into a plurality of three dimensional (3-D) voxels.

19. The system of claim 18, wherein in the aggregating, the one or more processors are configured to average subsets of the first and second outputs of the plurality of sensor returns.

20. The system of claim 12, wherein the plurality of sensor returns represent one of a range view or a bird's eye view relative to the autonomous vehicle.

21. The system of claim 12, wherein the property of the object includes at least one of predicted velocity information or predicted location information associated with the respective sensor return.

22. The system of claim 12, wherein in performing (c), the one or more processors are configured to generate, for at least the subset of the plurality of sensor returns, a third output that classifies the respective sensor return as corresponding to a vulnerable actor or non-vulnerable actor.

* * * * *